United States Patent [19]

Brech et al.

[11] Patent Number: 5,598,535
[45] Date of Patent: Jan. 28, 1997

[54] SYSTEM FOR SELECTIVELY AND CUMULATIVELY GROUPING PACKETS FROM DIFFERENT SESSIONS UPON THE ABSENCE OF EXCEPTION CONDITION AND SENDING THE PACKETS AFTER PRESELECTED TIME CONDITIONS

[75] Inventors: Brad L. Brech; Gary S. Delp; Albert A. Slane, all of Rochester, Minn.

[73] Assignee: International Business Machines Corporation, Armonk, N.Y.

[21] Appl. No.: 283,889

[22] Filed: Aug. 1, 1994

[51] Int. Cl.$^6$ ............................................. G06F 13/00
[52] U.S. Cl. ........................ 395/200.13; 364/222.2; 364/284.3; 364/284.4; 395/821; 395/862; 395/873
[58] Field of Search ................ 395/845, 850, 395/853, 861, 862, 865, 872, 873, 874, 880, 297, 200.01, 800, 741, 200.17, 200.1; 370/94.1, 17; 364/821, 862, 873, 222.2, 284.3, 284.4

[56] References Cited

U.S. PATENT DOCUMENTS

| | | | |
|---|---|---|---|
| 4,498,168 | 2/1985 | Tseng | 370/85 |
| 4,517,641 | 5/1985 | Pinheiro | 364/200 |
| 4,736,369 | 4/1988 | Barzilai et al. | |
| 4,922,244 | 5/1990 | Hullett et al. | |
| 5,040,176 | 8/1991 | Barzilai et al. | |
| 5,063,562 | 11/1991 | Barzilai et al. | |
| 5,101,402 | 3/1992 | Chiu et al. | |
| 5,123,091 | 6/1992 | Newman | 395/200 |
| 5,165,021 | 11/1992 | Wu et al. | |
| 5,166,930 | 11/1992 | Braff et al. | |
| 5,179,660 | 1/1993 | Devany et al. | 395/200 |
| 5,193,151 | 3/1993 | Jain | 395/200 |
| 5,260,942 | 11/1993 | Auerbach et al. | |

OTHER PUBLICATIONS

M. S. Chen, et al, "Path–Based Hop–By–Hop Buffer Class Window Flow Control", IBM Technical Disclosure Bulletin, vol. 29, No. 11, Apr. 1987, pp. 4782–4786.

Joudeh et al, "Delay Analysis For Packet Trains Over Computer Communication Networks", IEEE, vol. iii+360 pp., 19–20 May 1992.

*Primary Examiner*—Thomas C. Lee
*Assistant Examiner*—Terance J. Stanton
*Attorney, Agent, or Firm*—Owen J. Gamon; Andrew J. Dillon

[57] ABSTRACT

The present invention provides a method and apparatus processing system for enhancing the processing of a plurality of related packets received at a logical unit within a data processing system. A plurality of packets are received at the logical unit. Then each of the plurality of packets are examined and a session identification is obtained for each of the plurality of packets. During a preselected time window, each of the plurality of packets are associated with a group. Each packet in a group has a session identification that is identical to every other packet within the group.

3 Claims, 5 Drawing Sheets

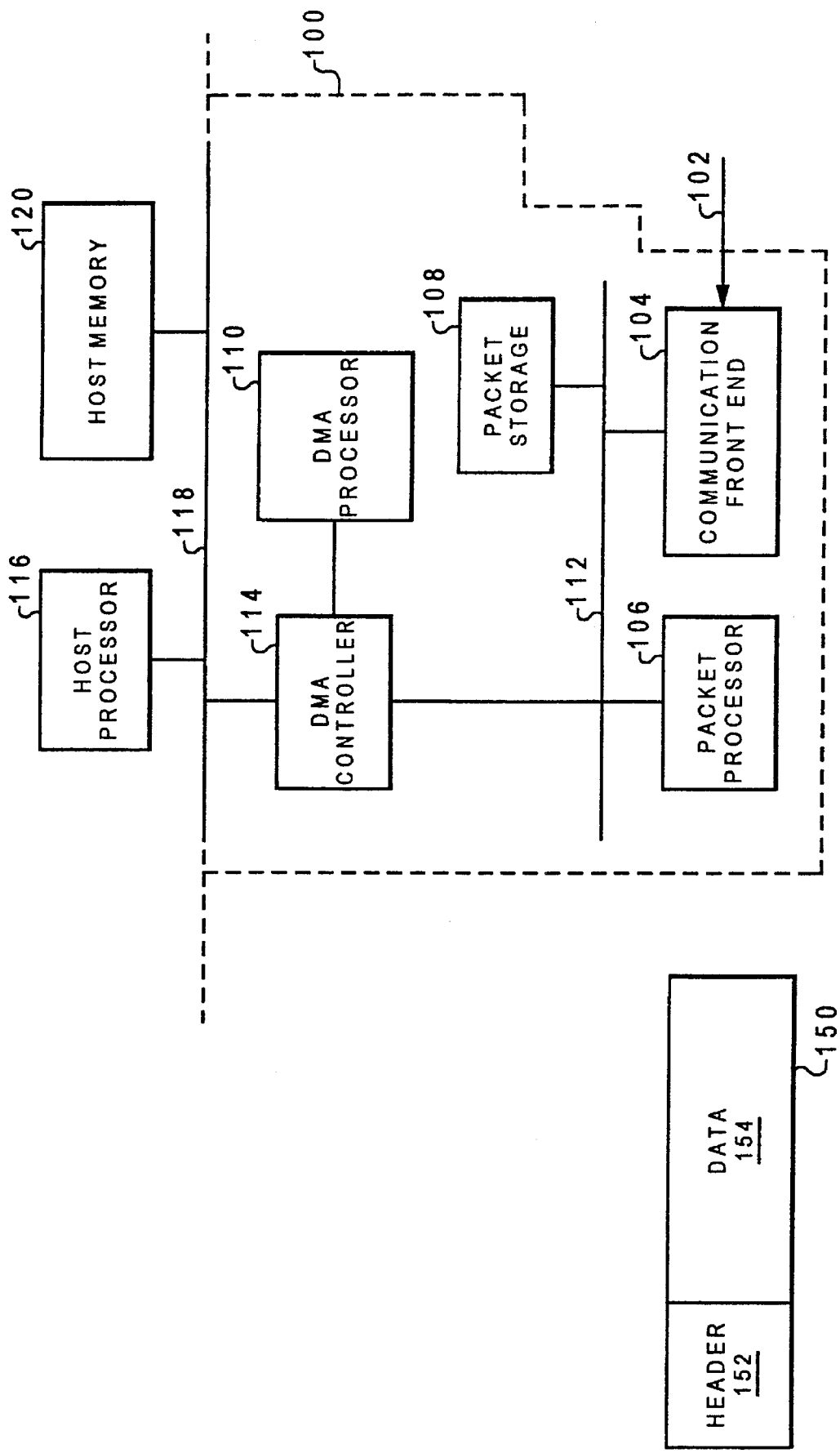

SYSTEM FOR SELECTIVELY AND CUMULATIVELY GROUPING PACKETS FROM DIFFERENT SESSIONS UPON THE ABSENCE OF EXCEPTION CONDITION AND SENDING THE PACKETS AFTER PRESELECTED TIME CONDITIONS

BACKGROUND OF THE INVENTION

1. Technical Field

The present invention generally relates to a method and apparatus for processing incoming packets and in particular to a method and apparatus for reducing the packet processing time. Still more particularly, the present invention relates to a method and apparatus for reducing packet processing time through the grouping of packets.

2. Description of the Related Art

The use of computer network systems for processing and transmitting data is well known in the prior art. A typical computer network system consists of at least one host computer running under some type of operating system, communications controls, communications media and a plurality of end users (terminals, printers, displays, etc.). The host computer is connected via communications media, to either a communications controller or an end user terminal. The communications controller interfaces with other communications controllers or end user terminals via communications media. The communications media may be, for example, telephone lines, channels, satellites, etc. By entering a request at a user's terminal, the user may extract data from the host computer. Similarly, a user may enter information on a terminal and have it transmitted to the host computer for processing and/or to another terminal in the network.

Various communications systems, including computer systems and computer network systems, transmit and receive information in the form of frames or packets. That is, a message or file may be broken up into many packets and sent to another user or computer on the system or network. Each packet is a separate entity on the transmission media. In the transmission of these packets, a processing overhead exists in terms of the time needed to process the packet.

Batching or consolidating single packets into groups can reduce the processing overhead when compared to processing the same number of packets separately. Consequently, consolidating the packets into a group can reduce the processing overhead since the system can process the entire group of packets at a single time. Consolidating packets into a group, however, presents some problems. Packets may arrive on the transmission media asynchonously and at somewhat random intervals. In addition, packets transmitted as a group from a source system do not always arrive as a group at the target or receiving system. That is, packets from multiple connections may be interspersed among each other.

Some data processing systems compare a first packet with a second packet to determine whether to batch the two packets together. For example, a header may be associated with a first packet is examined and a predicted profile is generated for comparison with a subsequent packet to determine whether the two packets can be consolidated together into a single group. A group also called a "super packet" could be completed when a subsequent packet did not match the profile or when the entire "super packet" was complete. Packets sent to the host processor cause an interruption so that the host processor may process the packets. It is desirable to minimize the number of times that a host processor is interrupted to process a packet or group of packets.

Therefore, it would be advantageous to have a method and apparatus for consolidating packets into groups to reduce the overhead necessary to process the packet while minimizing the number of times a host processor is interrupted to process a packet or group of packets.

SUMMARY OF THE INVENTION

The present invention provides a method and apparatus processing system for enhancing the processing of a plurality of related packets received at a logical unit within a data processing system. A plurality of packets are received at the logical unit. Then, each of the plurality of packets are examined and a session identification is obtained for each of the plurality of packets. During a preselected amount of time, also called a "time window", each of the plurality of packets are associated with a group. Each packet in a group has a session identification that is identical to every other packet within the group.

The time window may be altered to optimize processing within the data processing system. Also, a group may be established for each of multiple sessions and the time window for a particular session may vary from the time windows for the other sessions. The processes of the present invention may be implemented in either hardware and/or software.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 is a schematic representation of a receiving station for grouping data packets or frames in accordance with a preferred embodiment of the present invention;

FIG. 3 is a packet depicted in accordance with a preferred embodiment of the present invention;

DETAILED DESCRIPTION OF PREFERRED EMBODIMENT

As used herein, a "logical unit" is a device or program that an end user (such as a terminal operator and/or I/O mechanism uses to access a network. The logical unit may be hardware and/or programs. Within a structured protocol such as SNA, a logical unit includes the presentation services, data flow control, and transmission control layers. For purposes of description, the logical unit may be viewed as an access port into the network. The logical unit may or may not be the original source of a packet.

A "session" is a logical connection between two logical units. One or more sessions may be established between two logical units. Information relative to a session and its establishment is well known in the art. Therefore, detailed information will not be given here. Basically, a session is established when one logical unit sends another logical unit a SNA request known as the BIND which specifies the protocols that both logical units agree to abide by for the duration of the session. A more detailed description relative to session establishment can be found in Systems Network Architecture Format and Protocol Reference Manual: Architecture Logic (SC30-3112).

A "packet" contains data or control information surrounded by control and routing information supplied by various components in the network. A message sent from one logical unit to another may be sent via a single packet or the message may be broken up into several shorter packets with each packet containing a part of the message. Each of these packets contains a sequence number indicating the order in which the packets were sent.

Figure 1:
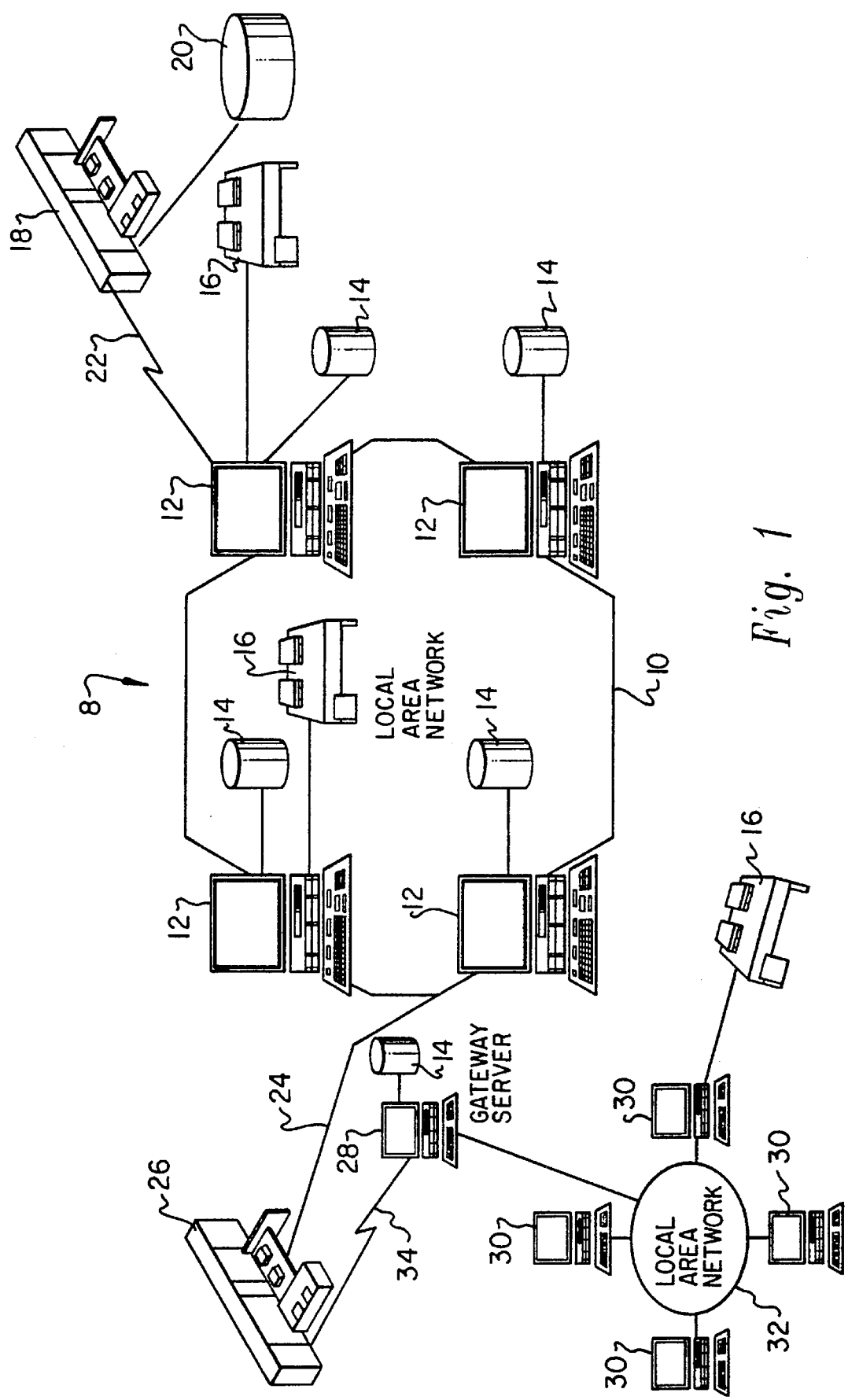
FIG. 1 depicts a typical data processing network which may be utilized to implement the present invention.

With reference now to the figures, and in particular with reference to FIG. 1, a pictorial representation of a data processing system 8, which may be utilized to implement a method and system of the present invention, is depicted. As may be seen, data processing system 8 may include a plurality of networks, such as local area networks (LAN) 10 and 32, each of which preferably includes a plurality of individual computers 12 and 30, respectively. Computers 12 and 30 may be implemented utilizing any suitable computer such as the IBM Personal System/2 (also called a "PS/2") computer or an IBM RISC SYSTEM/6000 computer, both products of International Business Machines Corporation, located in Armonk, N.Y. "RISC SYSTEM/6000" is a trademark of International Business Machines Corporation, "Personal System/2" and "PS/2" are registered trademarks of International Business Machines Corporation. Of course, those skilled in the art will appreciate that a plurality of intelligent work stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store documents or resource objects which may be periodically accessed by any user within data processing system 8. In a manner well known in the prior art, each such document or resource object stored within a storage device 14 may be freely interchanged throughout data processing system 8 by transferring a document to a user at an individual computer 12 or 32, for example.

Still referring to FIG. 1, it may be seen that data processing system 8 also may include multiple mainframe computers, such as mainframe computer 18, which may be preferably coupled to LAN 10 by means of communications link 22. Mainframe computer 18 may be implemented utilizing a Enterprise Systems Architecture/370 (also called an "ESA/370") or an Enterprise Systems Architecture/390 (also called an "ESA/390") computer available from IBM. Depending on the application a mid-range computer, such as a Application System/400 (also called an "AS/400"), may be employed. "Enterprise Systems Architecture/370", "ESA/370", "Enterprise Systems Architecture/390", and "ESA/390" are trademarks of IBM; "Application System/400" and "AS/400" are registered trademarks of IBM. Mainframe computer 18 also may be coupled to a storage device 20 which may serve as remote storage for LAN 10. Similarly, LAN 10 may be coupled via communications link 24 through a subsystem control unit/communications controller 26 and communications link 34 to a gateway server 28. Gateway server 28 is preferably an individual computer or IWS which serves to link LAN 32 to LAN 10.

As discussed above with respect to LAN 32 and LAN 10, a plurality of documents or resource objects may be stored within storage device 20 and controlled by mainframe computer 18, as Resource Manager or Library Service for the resource objects thus stored. Of course, those skilled in the art will appreciate that mainframe computer 18 may be located a great geographic distance from LAN 10 and similarly LAN 10 may be located a substantial distance from LAN 32. For example, LAN 32 may be located in California while LAN 10 may be located within Texas and mainframe computer 18 may be located in New York.

Electronic mail, files, documents, and other information may be sent between any of individual computers 12 and 30, gateway server 28, a computer within LAN 10 or LAN 32, or mainframe computer 18 through various communications, links or media. Communications media, as those skilled in the art will appreciate, or media or systems, which connect two or more computers, systems or networks together.

Referring now to FIG. 2, a schematic representation of a receiving station 100, also called a logical unit, which may be used for grouping packets or frames under a preferred embodiment of the present invention is illustrated. Receiving station 100 receives packets or frames from a communications link 102 at a communications front end 104. Communications front end 104 contains the circuitry for transmitting and receiving data and is employed to communicate with other data processing systems.

When a packet or frame is received, it is examined by packet processor 106 and stored in packet storage 108 or being sent to DMA processor 110. Communications front end 104, packet processor 106 and packet storage 108 are all connected by communications bus 112.

DMA controller 114 is connected to and controlled by DMA processor 110. DMA controller 114 receives packets from communications bus 112 and sends the packets to host processor 116 through its connection to system bus 118. The packets then are processed by host processor 116 and stored in host memory 120. Identification of a session may be accomplished in a number of different ways known in the art. For example, the particular LLCSAP (logical link control service access point) unique identification tuple, which is used in a fiber distributed data interface (FDDI) protocol may be used to identify a particular session. In particular, the tuple corresponds to a particular service access point, a particular host, a particular remote access point and a particular remote host and may be obtained from the header of a data packet. In accordance with a preferred embodiment of the present invention, the session ID may be obtained from a more general protocol level. For example, the headers also contain session ID data in the header of a packet. The present invention may be used to group packets for multiple sessions.

Referring now to FIG. 3, a packet 150 is depicted in accordance with a preferred embodiment of the present invention. Packet 150 includes header 152 and data section 154. Header 152 in packet 150 may be examined by a logical unit to determine the session ID.

For example, in SNA, the concept of a link station provides a unique session to batch packets. In TCP-IP the protocol ID, source, and destination IP addresses, and the source and destination ports form a unique session ID that may be used to batch packets.

Figure 4:
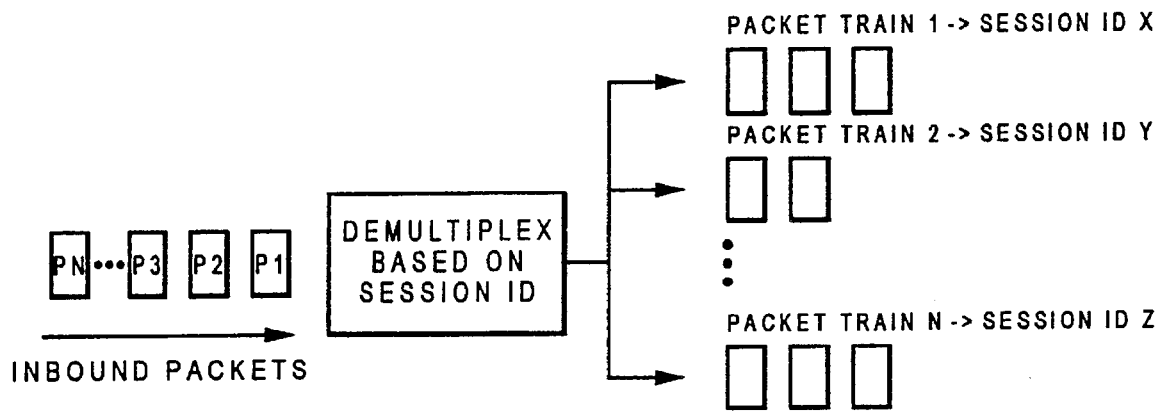
FIG. 4 is a diagram illustrating a demultiplexing process in accordance with a preferred embodiment of the present invention.

Referring now to FIG. 4, a diagram illustrating a demultiplexing process is depicted in accordance with a preferred embodiment of the present invention. Packets P1–PN are inbound packets that are received at receiving station 100 and "demultiplexed" based on session IDs. At the receiving station, the session ID is used to find a current packet train if one exists. A "packet train" is a collection of packets that are grouped together for processing. If a packet train is not present, a new packet train is started and a packet train timer is started. The packet train timer creates a time window, a period of time, in which packets for a particular session will be grouped together in a packet train. While the packet train timer is running, any new packets with the same session ID will be grouped with the particular packet train. As can be seen, the depicted embodiment includes three packet trains for three different sessions having session IDs: X, Y, and Z. When a packet train timer expires for a particular packet train, all of the packets grouped together for this particular packet train will be sent to the host processor for processing. Different packet trains may have packet train timers beginning at different times. For example, the packet train timer for session ID X and session ID Y may expire before the packet train timer for session ID Z.

Figure 5:
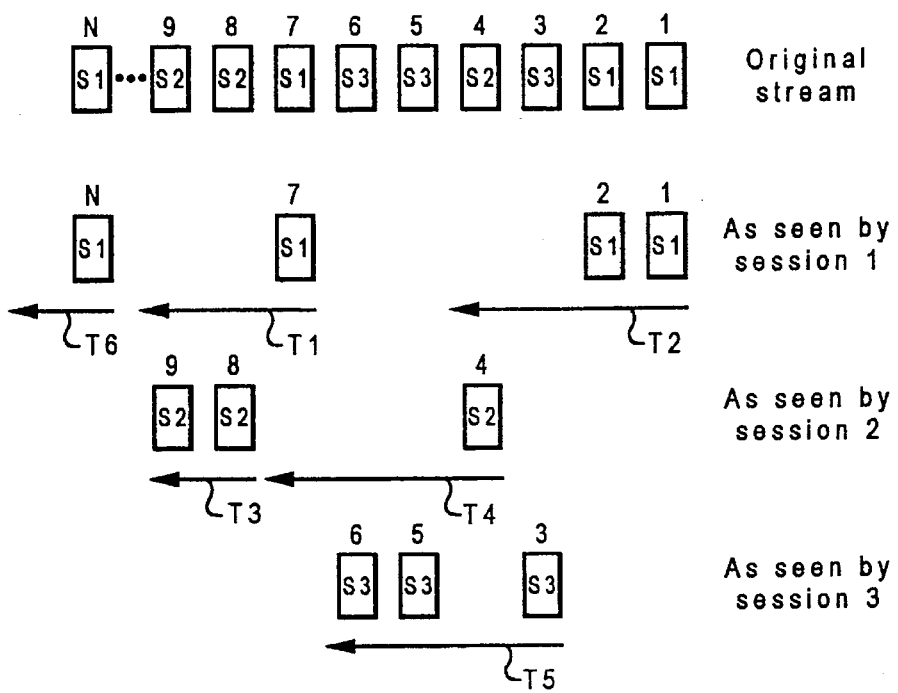
FIG. 5 depicts packet train determination using a time window in accordance with a preferred embodiment of the present invention.

Referring now to FIG. 5, an illustration of packet train determination using a time window is depicted. The original stream of packets include packets 1–N. Each of the packets in the depicted example include a session identification: S1, S2, or S3. Time windows T1–T6 are used to group packets into packet trains. For session 1, packets 1 and 2 are grouped together into a packet train and packet 7, and N are grouped together into two different packet trains. Session 2 includes a single packet, packet 4, in a packet train and packets 8 and 9 in a packet train. Packets 3, 5, and 6 are grouped into a single packet train for session 3. The arrow heads for time windows T1–T6 in FIG. 5 depict timer expiry (end of time window).

In accordance with a preferred embodiment of the present invention, the use of a time window allows non-consecutive packets to be grouped together and for multiple packet trains to be created concurrently. Using the time window and a queue for each packet train allows multiple packet trains to be created at the same time. In addition, the present invention allows for each packet train to be of some arbitrary length, which is determined by the number of packets that arrive for a session during a time window. The time windows may be set to optimize processing by the host processor in accordance with a preferred embodiment of the present invention. In addition, different time window sizes may be created for different sessions, which further adds to the flexibility of the present invention.

Figure 6:
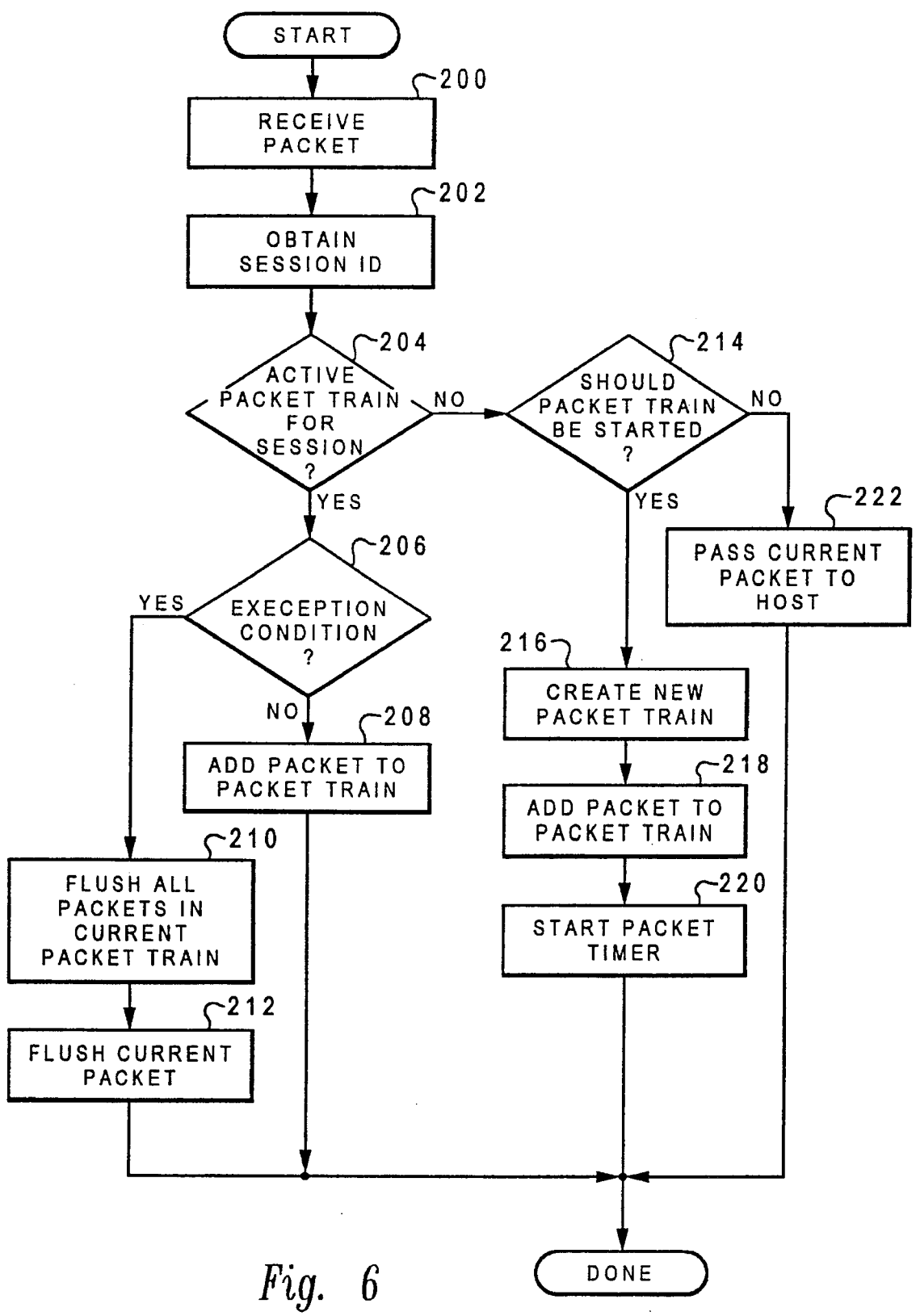
FIG. 6 is a flow chart of a process for grouping packets into a packet train in accordance with a preferred embodiment of the present invention.

Referring now to FIG. 6, a flow chart of a process for grouping packets into a packet train is illustrated in accordance with a preferred embodiment of the present invention. The process begins by receiving a new packet at the logical unit (step 200). Thereafter, the packet is examined and a session ID is obtained for the packet (step 202). A determination of whether an active packet train is present for the session designated by the session ID obtained in step 202 is made (step 204). If an active packet train is present for the session, then a determination of whether an exception condition exists is made (step 206). An exception condition indicates that resources for processing packets are low. If an exception condition does not exist, the packet is added to the packet train for the session identified from the examination of the packet (step 208) with the process terminating thereafter.

Referring back to step 206, if an exception condition exists, the process then flushes all of the packets in the current packet train (step 210). Flushing of the packets in the current packet train occurs when the packets are sent up to the host processor for processing. Then, the current packet is flushed (step 212) with the process terminating thereafter.

Referring back to step 204, if an active packet train is not present for the session identified, a determination of whether a new packet train should be started for the session is made (step 214). In making this determination, the process determines whether a resource shortage is present. An answer YES to step 214 results in the creation of a new packet train (step 216). Thereafter, the packet is added to the packet train (step 218). A packet timer is started (step 220) with the process terminating thereafter. The packet timer is used to set the size of time window in which packets will be added to a packet train for a session.

Referring again to step 214, if a packet train is not to be started, the current packet is passed to the host processor (step 222) with the process terminating thereafter. The process depicted in FIG. 6 is repeated as necessary to process packets received at a logical unit.

Figure 7:
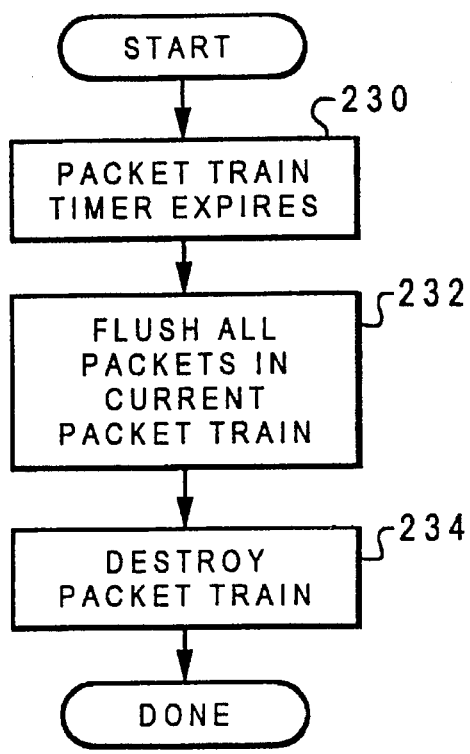
FIG. 7 depicts a flow chart of a process for handling a packet train timer expiration in accordance with a preferred embodiment of the present invention.

Referring now to FIG. 7, a flow chart of a process for handling a packet train, expiration is depicted in accordance with a preferred embodiment of the present invention. The process begins by detecting the expiration of a packet train timer (step 230). In response to detecting the expiration of a packet train timer, all packets in the current packet train are flushed (step 232). The packet train is then destroyed by releasing any data structures used to store or process the packet train (step 234).

Figure 8:
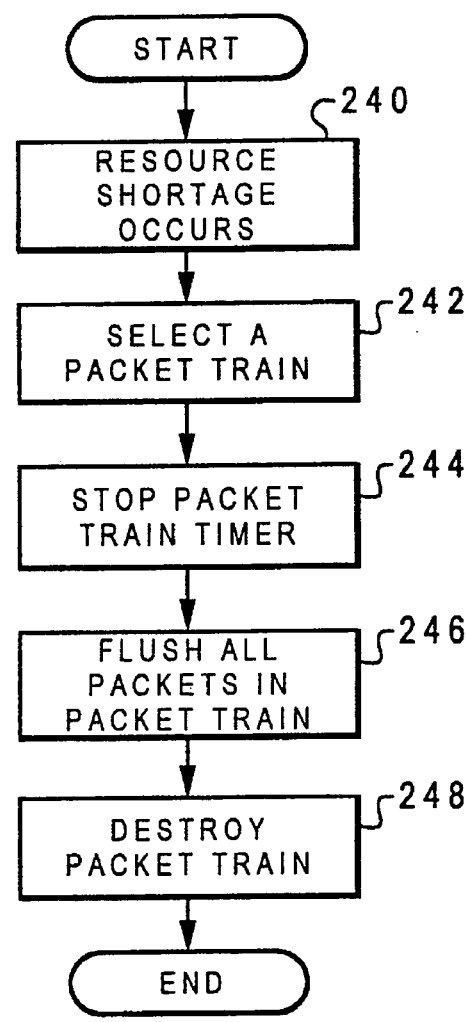
FIG. 8 is a flow chart of a process for handling a resource shortage condition in accordance with a preferred embodiment of the present invention.

Referring now to FIG. 8, a flow chart of a process for handling a resource shortage condition is depicted in accordance with a preferred embodiment of the present invention. First, a resource shortage is detected (step 240). In response to a resource shortage, a packet train is selected (step 242) and the packet train timer for the selected packet train is stopped (step 244). Thereafter, all packets in the selected packet train are flushed (step 246). Then the packet train is destroyed by freeing all of the data structures used to store and track the packet train (step 248) with the process terminating thereafter.

The present invention increases the processing efficiency in a data processing system through batching packets using a period of time, a time window, to group packets into a packet train for a session. In addition, a packet train may be created for each session and each session may have a different time window in accordance with a preferred embodiment of the present invention. Using the present invention, the number of host interruptions may be minimized. As a result, multiple ongoing packet trains may be created and used to increase the efficiency of batching packets in a data processing system.

While the invention has been particularly shown and described with reference to a preferred embodiment, it will be understood by those skilled in the art that various changes in form and detail may be made therein without departing from the spirit and scope of the invention.

We claim:

1. A data processing system for processing a plurality of related packets received at a logical unit within said data processing system, wherein packets from different sessions may be interpersed within said plurality of packets, said data processing system comprising:

a host system, wherein said host system is connected to said logical unit;

reception means for receiving said plurality of packets at said logical unit, wherein each of said plurality of packets includes a header containing a session identifier;

examination means for examining said session identifier in each of said plurality of packets received at said logical unit to identify said session for each of said plurality of packets;

grouping means for selectively and cumulatively grouping all packets within a first identified session received during a first preselected time period in a first group when there is no exception condition related to the packet resources shortage for the first identified session, and for selectively and cumulatively grouping all packets within a second identified session received during a second preselected time period in a second group when there is no exception condition related to the packet resources shortage for the second identified session, wherein said first group is associated with said first preselected time period and said second group is associated with said second preselected time period;

processing means for processing said first group and said second group concurrently;

flushing means for flushing said groups of packets to said host system upon detection of said exception condition; and transmitting means for transmitting said groups to said host system after each preselected period has completed and the absence of the exception condition.

2. A data processing system for processing a plurality of packets according to claim 1, wherein each of said plurality of packets further includes a data section.

3. A data processing system for processing a plurality of packets according to claim 1, wherein said data processing system further includes connection means for connecting said host system to said logical unit.

* * * * *